Aug. 7, 1956     A. WITTLIN     2,757,632
FLUID FLOW TUBE
Filed Oct. 9, 1953     2 Sheets-Sheet 1
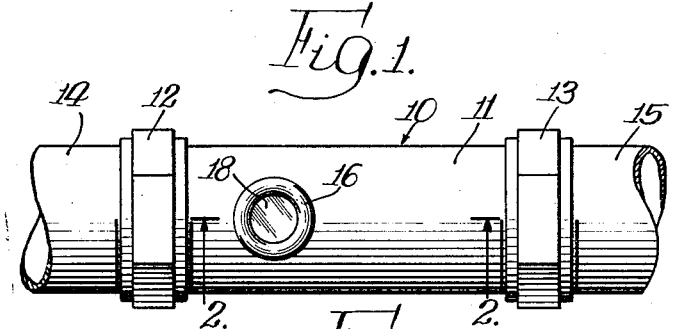
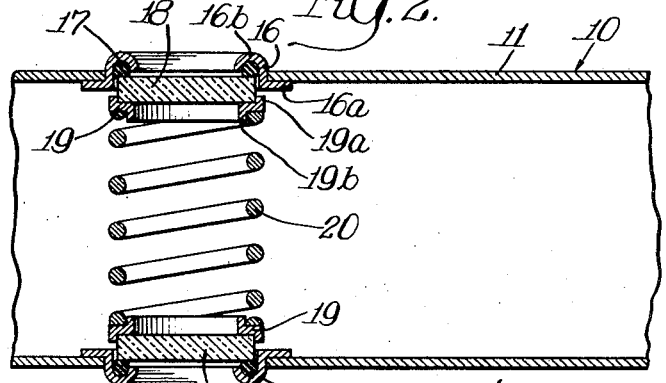
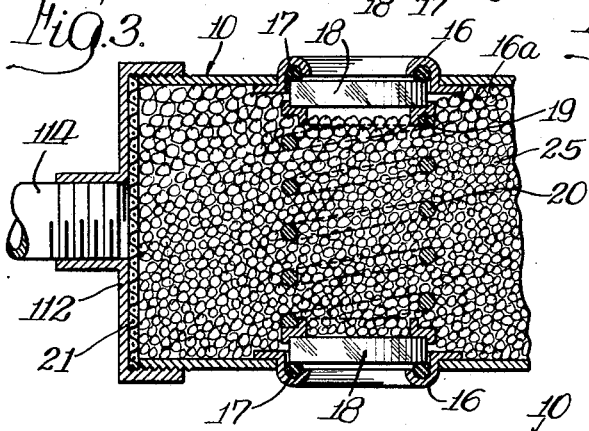
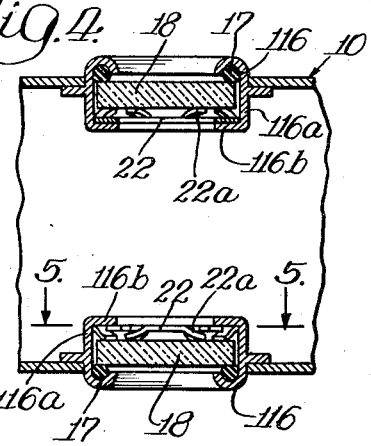
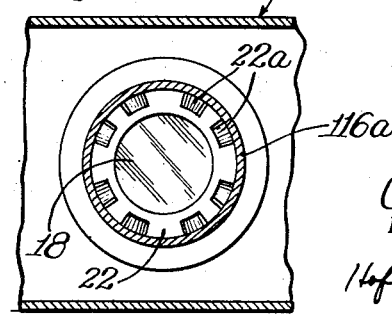
INVENTOR.
Albert Wittlin Aug. 7, 1956 — A. WITTLIN — 2,757,632
FLUID FLOW TUBE
Filed Oct. 9, 1953 — 2 Sheets-Sheet 2
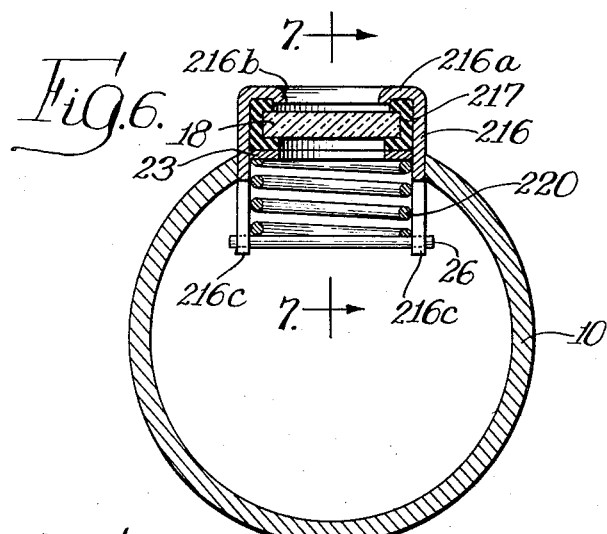
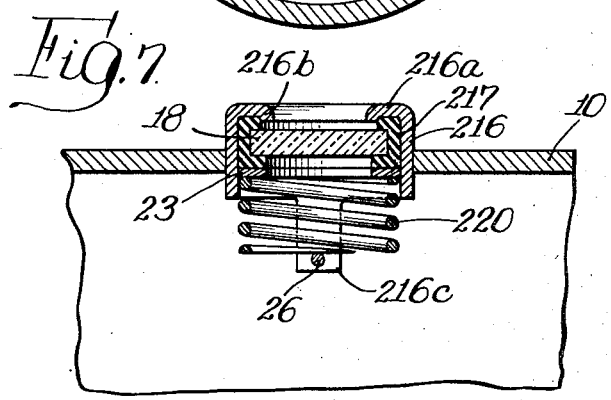
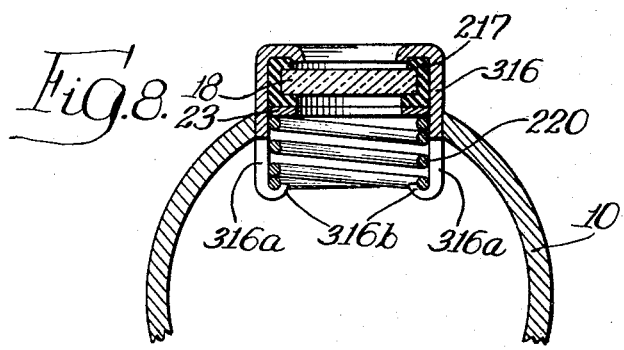
INVENTOR.
Albert Wittlin,
BY Schroeder, Merriam, Hofgren & Brady Attys.

United States Patent Office 2,757,632
Patented Aug. 7, 1956

2,757,632

FLUID FLOW TUBE

Albert Wittlin, Chicago, Ill.

Application October 9, 1953, Serial No. 385,086

7 Claims. (Cl. 116—117)

This invention relates to a tube adapted to have fluid such as a refrigerant flow therethrough and containing a transparent member in the shell thereof through which a desiccant can be observed when the tube is used as a refrigerant desiccator and through which fluid flow may be observed when the tube is used as a liquid flow indicator.

In ordinary refrigerant circuits such as are used in the typical refrigeration apparatus, it is customary to employ a liquid flow indicator through which the refrigerant flows and which contains at least one transparent portion for observing the condition of the fluid.

The flow tube of the present invention may be used either as a flow indicator, in which case it is used empty so that the refrigerant may flow through, or it may be used as a desiccator, in which case the tube is preferably substantially completely filled with a desiccant. When used as a desiccator, the tube preferably contains a desiccant having mixed therewith an indicator which changes color when the desiccant has become substantially saturated with moisture. Thus, a suitable material might be a cobalt indicator of which cobaltus chloride is one example. This material has a predominantly blue color when it is dry and becomes predominantly red when saturated. With this arrangement, the observer can note when it is time to replace the desiccant with fresh material. This desiccant may be any of the usual materials of which silicon dioxide is an example. Both the silicon dioxide and the cobaltus chloride may be regenerated when saturated with moisture by merely heating to drive off this moisture. Of course, other desiccants and other indicators may be used if desired and large numbers of these materials are well known to those skilled in the the art.

Another very important feature of this invention is to provide such a fluid flow tube that is usable as a liquid indicator as well as adapted to contain a desiccant by merely changing the end fittings connected to the central shell part of the tube, this tube including the shell through which fluid flows when the tube is in use, an open frame in the shell enclosing only a minor fractional portion of the total shell area, a transparent member in the frame, and a sealing gasket between the frame and transparent member and normally acted upon by the fluid pressure to increase the sealing pressure of the gasket with increased fluid pressure within the tube; the frame and transparent member being located in a portion of the shell closely adjacent to the fluid stream for ready observation of the conditions within the shell such as the condition of the fluid when the tube is used as an indicator and the condition of the desiccant when the tube is used as a drier.

The invention will be described as related to the embodiments shown in the drawings, of which:

Figure 1 is an elevation of one embodiment of the invention positioned in a fluid flow line;

Figure 2 is a longitudinal section taken substantially along line 2—2 of Figure 1;

Figure 3 is a fragmentary sectional view similar to Figure 2 but showing the tube containing a desiccant and usable as a drier;

Figure 4 is a fragmentary sectional view somewhat similar to Figure 2 showing a second embodiment of the invention;

Figure 5 is a sectional elevation taken substantially along line 5—5 of Figure 4;

Figure 6 is a transverse sectional elevation through the shell of a tube showing a second alternate embodiment of the invention;

Figure 7 is a sectional elevation substantially along line 7—7 of Figure 6; and

Figure 8 is a view similar to Figure 6 showing another embodiment of the invention.

In the embodiment of Figures 1 and 2 the fluid flow tube 10 comprises an elongated cylindrical shell 11 having end connector members 12 and 13. The member 12 is adapted to be connected to a fluid line 14 while the member 13 is adapted to be connected to a similar line 15. Each line is substantially the same internal diameter as that of the shell 11 so that turbulent flow through the device is avoided, as much as possible. With this arrangement, fluid flows in one line 14 or 15 and through the tube 10 and out through the other line. Thus, the tube 10 is placed in the fluid line so that the fluid, which may be a refrigerant, will flow therethrough. In order to permit observation of the interior of the shell 11 to determine the condition of the fluid, the shell is provided with at least one open frame 16 in the wall of the shell enclosing only a relatively small area. Thus, as is shown, this area is only a minor fractional portion of the total shell area. The frame 16 may be attached to the shell 11 by any means desired. As shown, it is attached by means of an outwardly extending flange 16a adapted to bear against the inner surface of the shell 11 and to be attached thereto such as by brazing.

The outer portion of the frame 16 is preferably turned inwardly as illustrated at 16b to provide a channel section with this channel section being of inwardly concave cross-section with concave portions being on the inner surface thereof.

Within the channel section 16b of the frame 16 is positioned a gasket 17 preferably of synthetic rubber such as neoprene. This gasket may, of course, be any chemically resistant sealing material.

Bearing against the inner surface of the gasket 17 is a substantially circular transparent member 18 such as a glass disk. This member is spaced from the frame 16 and is, in effect, floating on the gasket 17. This arrangement is provided in order to prevent damage to the transparent member under the forces of expansion and contraction of the flow tube.

In the embodiments shown in Figures 1, 2 and 3 there are provided a pair of frames 16, each having a gasket 17 and a transparent member 18. If desired, of course, only one frame and transparent member need be provided, especially where the tube is used primarily as a desiccator. However, where the tube is to be used primarily as a fluid flow indicator, two installations are provided so as to aid the observation of the fluid. In such instance, the transparent members are preferably located opposite to each other, as illustrated in Figures 1 and 2, so that the observer can look through both transparent members at the same time and can see through and across the flowing stream.

Each transparent member 18 is provided with a washer 19 having an outer flange 19a adapted to extend around the transparent member 18 and an inwardly spaced inner flange 19b. The space between the flanges 19a and 19b provides a seat for one end of a helical compression spring 20. The spring is of large pitch so that substantial space may be provided between adjacent coils to prevent undue obstruction of the fluid flow.

In the embodiment shown in Figures 1 to 3, one end of the spring 20 bears against one gasket 17 while the other end bears against the second gasket 17. With this arrangement, the outward force of a single spring serves to hold both transparent members 18 in sealing engagement with the gaskets 17.

In the embodiment of Figure 2, the flow tube 10 is used as an indicator. In the embodiment of Figure 3, the tube contains a disiccant 25 preferably having mixed therewith an indicator of the above described type. Each end of the tube 10 is provided with an open screen 21 in order to prevent escape of the material 25. Here the tube is considerably larger than the lines, as shown at 114, and is usually relatively long in order that the liquid will have ample time to contact the desiccant. Each end of the tube is provided with a line connector as shown at 112.

In the embodiment shown in Figures 4 and 5, the frame 116 is provided with an inwardly directed cylindrical extension 116a and an inwardly directed annular flange 116b on the inner surface thereof. This annular flange is adapted to support an annular washer 22 which is provided with outwardly struck spring fingers 22a bearing against the inner surface of the transparent member 18. In this construction, the spring fingers 22a act as springs to hold the transparent member against the gasket 17.

In the embodiment shown in Figure 6, the frame 216 has a cylindrical body and is provided at its outer end with an inwardly directed annular flange 216a. This flange 216a has an inwardly rolled inner edge 216b so that the combination of the sidewall of the frame 216 at the outer end thereof, flange 216a and the inwardly turned edge 216b form a channel for holding the gasket 217. This gasket is preferably of U-shaped cross-section as illustrated in Figure 6 and is adapted to embrace the edge of the transparent member 18. The gasket 217 may be made in one piece as illustrated or may be made in a plurality of separate pieces so that, when assembled, they will function in the manner illustrated in the drawings.

Immediately inwardly of the gasket 217 there is provided a washer 23 bearing against the inner surface of this gasket. This washer serves as a bearing washer against which bears the outer end of a helical compression spring 220. The inner end of this spring bears against a cross pin 26 which serves to lock the spring in place. The pin extends between a pair of parallel inwardly-extending arms 216c and does not materially interfere with the observer's view of the interior of the flow tube. The arms 216c are preferably aligned transversely to the major axis of the tube and present their edges to the current of fluid in order to minimize turbulency. This is particularly important when the tube is used as an indicator.

In the embodiment shown in Figure 8 the frame 316 is provided with similar downwardly-directed arms 316a, except here the arms are provided with inwardly-rolled portions 316b at their inner ends to retain the inner end of the spring 220. The transparent member 18 and the gasket 217 are essentially the same.

One of the very important features of this invention is the provision of a structure wherein the shell and transparent members and the mounting frames and associated structure may be essentially the same whether the device is to be used as an indicator or as a drier. As has been pointed out above, when the device is used as an indicator end fittings are provided for connection into the fluid line and these fittings and the center shell are chosen so that there will be substantially no change in diameter when passing from the line into the tube and back into the line. This is done in order to reduce turbulency. Thus, when used as an indicator the devices are preferably employed in relatively large lines such as are found in commercial refrigeration lines.

When the tube is used as a drier, the shell is then preferably considerably larger than the connecting line and is of relatively great length in order that the fluid may have sufficient time to contact the desiccant.

Another important feature of the invention is the provision of a construction in which the transparent members are relatively small so that they occupy only a very minor fractional portion of the total shell area. This small area of the transparent member reduces the danger of accidental breakage, aids in securing a fluid-tight connection between the transparent member and the remainder of the structure, reduces the cost of the device and results in many other important advantages.

Another very important feature of the invention is to provide a construction wherein increased fluid pressure within the device appears to increase the sealing effect of the gasket. Another important construction feature is the gasket is located in a chanel so that the gasket will not be distorted outwardly when subjected to heavy internal forces. This arrangement makes it possible to use a softer gasket for a better seal without danger of extrusion and the gasket will last longer, without becoming worn. Furthermore, with this construction, even when the gasket has been in use long enough to begin to take a permanent set, it will not be distorted to the extent that leakage occurs.

As was explained above, the flow tube may contain one or more transparent members. In each instance, the transparent member should be located adjacent to the principal fluid stream for ready observation of the conditions within the shell. Thus, in the embodiments illustrated, the fluid flows from one end to the other of the shell of the tube and the transparent member is located in a sidewall so that the observer can look in the direction that is transverse to the fluid stream. This aids in observing the condition of the fluid either by observing the fluid stream itself when the device is used as an indicator or by observing the color content of the desiccant when the device is used as a desiccator.

Although the fluid flow tube of this invention has been described primarily in conjunction with a refrigerant system, it is obvious that it can be used with any fluid apparatus where it is necessary to observe the condition of the fluid.

Although the transparent members 18 have been shown as flat disks, it is obvious that they may be flat or curved as desired.

Having described my invention as related to certain embodiments thereof, it is my intention that the invention be not limited by any of the details of description and rather be construed broadly within its spirit and scope as set out in the accompanying claims.

I claim:

1. A fluid flow tube usable as a liquid indicator as well as adapted to contain a desiccant, comprising, a shell through which fluid flows when the tube is in use, an open frame in said shell enclosing only a minor fractional portion of the total shell area, a transparent member in said frame, a sealing gasket between the frame and the transparent member and normally acted upon by the fluid pressure to increase the sealing pressure of the gasket with increasing fluid pressure within the tube, outer portions of the gasket being exposed to atmospheric pressure, and means for locking the gasket in place to prevent excessive extrusion thereof toward the region of atmospheric pressure, the frame and transparent member being located in a portion of the shell closely adjacent to the principal fluid stream for ready observation of the condition within the shell.

2. The tube of claim 1 wherein said locking means includes a channel section adjacent to the edge of the frame of concave cross-section in which the gasket is located, the channel serving to hold the gasket against excessive outward as well as excessive inward displacement of the gasket material caused by severe fluid pressure.

3. The tube of claim 1 wherein the gasket is located between an outer surface of the transparent member and an inner surface of the frame, and said locking means comprises a channel section adjacent to the edge of the frame of concave cross-section in which the gasket is located, the channel serving to hold the gasket against excessive outward as well as excessive inward displacement of the gasket material caused by severe fluid pressure.

4. A fluid flow tube usable as a liquid indicator as well as adapted to contain a desiccant, comprising, a shell through which fluid flows when the tube is in use, an open frame in said shell enclosing only a minor fractional portion of the total shell surface area, a transparent member in said frame, a sealing gasket between an outer surface of the transparent member and an inner surface of the frame and located in a channel of concave cross-section adjacent to the edge of the frame to hold the gasket against excessive outward as well as excessive inward displacement of the gasket material caused by severe fluid pressure and spring means acting in conjunction with the fluid pressure to increase further the sealing pressure on said gasket.

5. The tube of claim 4 wherein said frame and transparent member assembly is located in a portion of the shell closely adjacent to the principal fluid stream for ready observation of the condition thereof.

6. The tube of claim 4 wherein said shell is elongated with the fluid normally passing from one end to the other in flowing through the tube, and the frame and transparent member assembly is located in an opening in the side of the tube.

7. A fluid flow tube usable as a liquid indicator as well as adapted to contain a desiccant, comprising, a shell through which fluid flows when the tube is in use, a pair of open frames in said shell each enclosing only a minor fractional portion of the total shell area, the frames being located opposite each other so that an observer can see through the tube when the tube is empty, a transparent member in each frame, a sealing gasket between an outer surface of the transparent member and an inner surface of the frame and located in a channel of concave cross-section adjacent to the edge of the frame to hold the gasket against excessive outward as well as excessive inward displacement of the gasket material caused by severe fluid pressure, and spring means acting in conjunction with the fluid pressure to increase further the sealing pressure on said gasket.

References Cited in the file of this patent

UNITED STATES PATENTS

| | | |
|---|---|---|
| 1,183,872 | Groff | May 23, 1916 |
| 2,357,753 | Matuszak | Sept. 5, 1944 |
| 2,594,113 | Askin | Apr. 22, 1952 |
| 2,650,562 | Bonar | Sept. 1, 1953 |